(12) United States Patent
Casey et al.

(10) Patent No.: US 7,258,779 B2
(45) Date of Patent: Aug. 21, 2007

(54) METHOD AND MEANS FOR HYDROGEN AND OXYGEN GENERATION

(76) Inventors: Alan Patrick Casey, 1 Otiose Court, Tallai, Queensland 4213 (AU); Stewart Smith, 7 Koda Court, Bonogin, Queensland 4213 (AU)

( * ) Notice: Subject to any disclaimer, the term of this patent is extended or adjusted under 35 U.S.C. 154(b) by 510 days.

(21) Appl. No.: 10/492,576

(22) PCT Filed: Nov. 13, 2002

(86) PCT No.: PCT/AU02/01541

§ 371 (c)(1),
(2), (4) Date: Sep. 22, 2004

(87) PCT Pub. No.: WO03/042431

PCT Pub. Date: May 22, 2003

(65) Prior Publication Data

US 2005/0029119 A1 Feb. 10, 2005

(30) Foreign Application Priority Data

Nov. 13, 2001 (AU) .................................... PR-8839

(51) Int. Cl.
*C25C 1/02* (2006.01)
(52) U.S. Cl. ...................... 205/628; 205/630; 205/633; 205/637; 205/638; 205/743; 205/744; 204/278.5; 204/267; 204/268; 204/269; 204/270

(58) Field of Classification Search ................ 205/628, 205/630, 633, 637, 638, 743, 744; 204/278.5, 204/267, 268, 269, 270
See application file for complete search history.

(56) References Cited

U.S. PATENT DOCUMENTS

| 3,957,618 | A | 5/1976 | Spirig |
| 4,124,463 | A | 11/1978 | Blue |
| 4,442,801 | A | 4/1984 | Glynn et al. |
| 4,450,060 | A | 5/1984 | Gonzalez |
| 5,217,507 | A | 6/1993 | Spirig |
| 5,231,954 | A | 8/1993 | Stowe |
| 5,399,251 | A | 3/1995 | Nakamats |
| 5,549,812 | A * | 8/1996 | Witt a.k.a. Witte ......... 205/744 |
| 6,096,177 | A | 8/2000 | Kamitani et al. |
| 6,257,175 | B1 | 7/2001 | Mosher et al. |
| 6,311,648 | B1 | 11/2001 | Larocque |

FOREIGN PATENT DOCUMENTS

WO WO9851842 11/1998

* cited by examiner

*Primary Examiner*—Bruce F. Bell
(74) *Attorney, Agent, or Firm*—Dority & Manning, P.A.

(57) ABSTRACT

A method and means for producing a combustible mixture of hydrogen and oxygen by electrolysis of water using a pulsed application of water onto electrodes while applying an electrical potential between electrodes and where the electrodes are not immersed in the water which flows between the electrodes while undergoing electrolysis.

12 Claims, 7 Drawing Sheets

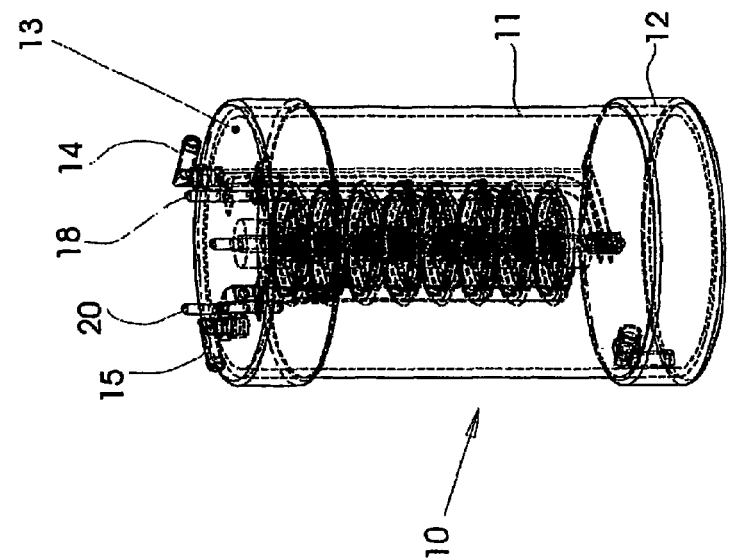
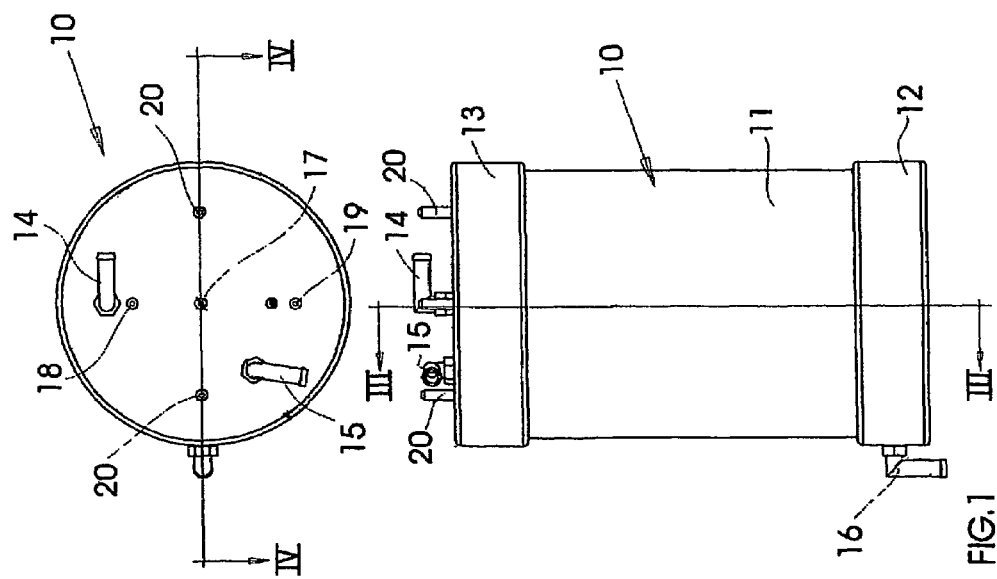

ular, the
METHOD AND MEANS FOR HYDROGEN AND OXYGEN GENERATION

TECHNICAL FIELD

The present invention relates to the electrolytic production of hydrogen and oxygen in a chamber. In particular, the hydrogen and oxygen may be drawn off as a detonating gas mixture in an on-demand basis.

The reference to any prior art in this specification is not, and should not be taken as, an acknowledgment or any form of suggestion that prior art forms part of the common general knowledge in Australia.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

BACKGROUND ART

The purposes for and advantages of producing a hydrogen and oxygen mix via electrolysis is well known and can be seen from the disclosures of U.S. Pat. Nos. 4,124,463, 4,442,801, 4,450,060, 5,217,507, 5,231,954, 5,399,251, and 6,257,175 and from WO 98/51842, by way of example.

The present invention derives from the disclosure of U.S. Pat. No. 4,124,463 which concerns a process and apparatus for producing a combustible mixture of hydrogen and oxygen by electrolysis.

In using an electrolytic cell of the general form depicted in the drawings of U.S. Pat. No. 4,124,463 it was found that flooding the casing containing the anodes and cathodes caused slow reaction times and required substantial electrical input which resulted in boiling of the liquid. In addition, if the water level within the casing fell below the uppermost electrode plate there was an increased chance of an explosion which would release a volume of boiling liquid from the casing.

DISCLOSURE OF INVENTION

Bearing in mind the foregoing prior art arrangement, the problems associated therewith have been ameliorated by controlling the metering of water and electrolyte onto the cells in a pulsing mode without flooding or filling the container so as to totally submerge the anodes and cathodes in water and electrolyte. This method has been found to enable the generated hydrogen and oxygen gases to clear the electrodes in a pulsing manner, which significantly improves the efficiency of the electrolytic action by allowing the maximum available area to be exposed to electrolyte and the applied voltage.

The cell container does not function as a reservoir for a water and electrolyte solution, as the liquid within is continuously drained off to a holding tank, but the hydrogen and oxygen produced by the cell creates a froth or foam of bubbles. That froth effectively forms an electrical conductor between each joined bubble to an earth on the system. That electrical earthing through the bubbles improves the level of safety by ameliorating the potential for electrostatic sparking and ignition of the combustible mixture.

The froth of hydrogen and oxygen bubbles is drawn off from the top of the cell container to then pass through a scrubber tank to break the bonds of the bubbles and release the contained hydrogen and oxygen gases. The released gases then pass from the scrubber tank into a dry tank ready for use by a system requiring that combustible mixture.

Typically, embodiments of the present invention are suited for on-demand generation of a combustible mixture of hydrogen and oxygen gases for subsequent use, in such as internal or external combustion engines or other devices.

In accordance with another aspect the present invention there is provided an electrolytic cell for producing hydrogen and oxygen from an aqueous solution, said cell including a plurality of electrode pairs of opposite polarity, each electrode being substantially planar and disposed in a substantially horizontal orientation, metering means for controlling a pulsed flow of an aqueous solution onto one electrode of each pair of electrodes and wherein the solution flows from the one electrode to the other electrode of each pair and wherein, when the cell is in use, the electrodes are not immersed beneath the surface of a contained quantity of the solution.

In an embodiment of this aspect of the present invention provides an electrolytic cell, of the general appearance but differing in operation from that disclosed in U.S. Pat. No. 4,124,463, wherein widely spaced anode and cathode pairings are formed as spaced apart units along the central post in said pairs.

In another embodiment of this cell there are means for metering the water flow and pulsing means for applying amounts of the water and electrolyte solution onto an uppermost one of each cathode-anode pairs such that the solution cascades or flows to the lowermost one of each cathode-anode pair and means for removing liquid from the bottom of the cell and means for feeding generated hydrogen and oxygen gases and/or froth or bubbles containing hydrogen and oxygen from the cell are provided.

In a still further embodiment, the container enclosing the cell is formed with a lid which is a gas tight push-fit onto the body of a container so as to be separable from the body of the container should the pressure within the container exceed a predetermined limit.

In another embodiment, the rate of output of hydrogen and oxygen from the electrolytic cell is controlled via on-demand control means. Examples of such means are disclosed in U.S. Pat. No. 4,442,801 and U.S. Pat. No. 4,124,463.

BRIEF DESCRIPTION OF DRAWINGS

The present invention will now be described by way of example with reference to the accompanying drawings, in which:

FIG. 1 shows plan and side elevation views of a container housing an electrolytic cell structure in accord with one embodiment of the present invention;

FIG. 2 is a ghosted perspective view of the container of FIG. 1 showing the positioning of an internal electrolytic cell of one embodiment in accord with the present invention;

BEST MODES

Figure 3:
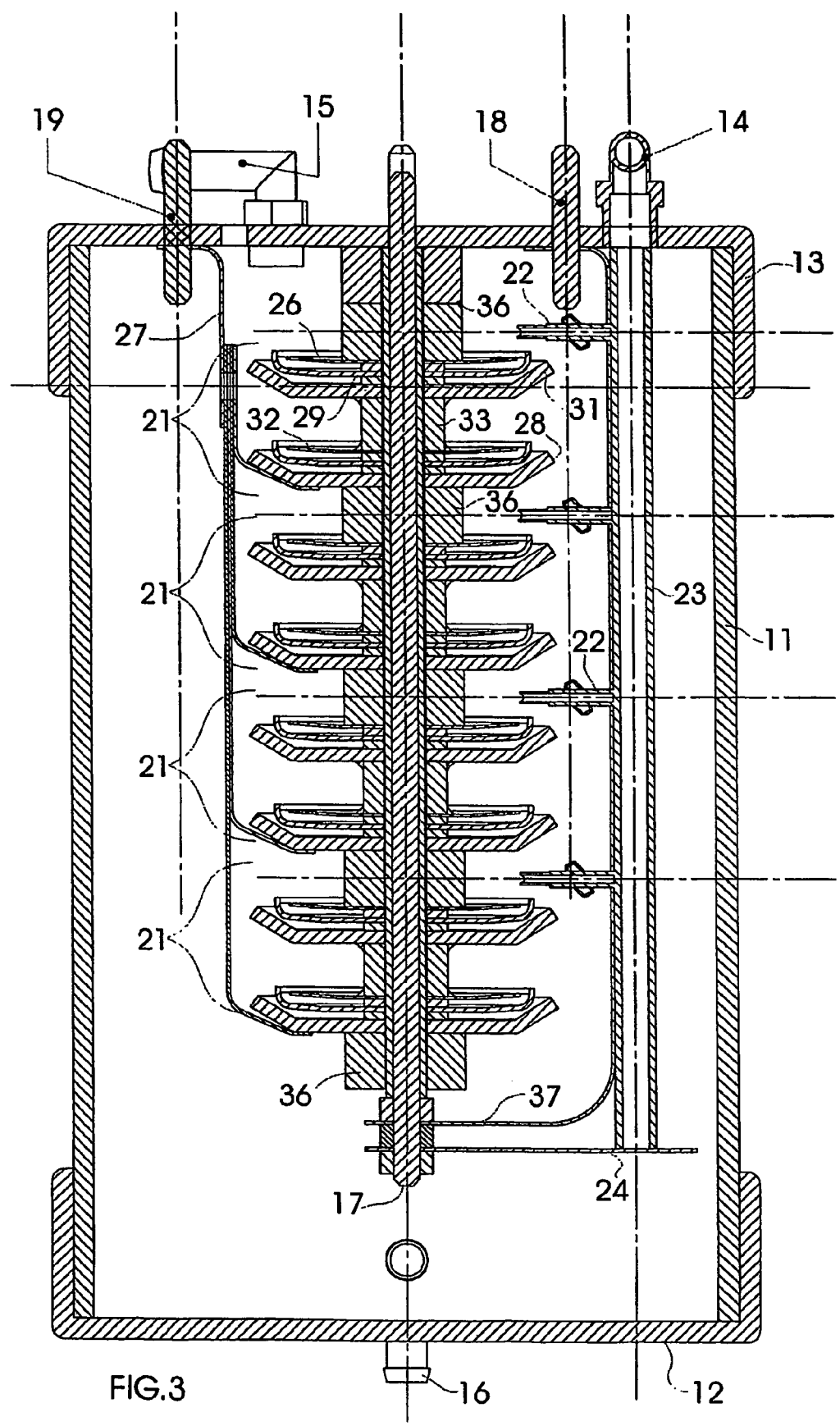
FIG. 3 is a longitudinal cross sectional view III-III of FIG. 1.

In FIG. 1, container 10 comprises cylindrical housing 11, bottom cap 12 and lid 13. Lid 13 is a gas tight push-fit onto housing 11 so as to lift off under a pressure build up within housing 11.

On lid 13 there is a water and electrolyte solution inlet 14 and an outlet 15 for gases and froth and bubbles containing gases generated by the cell within the housing 10. Liquid draining outlet 16 fitted to bottom cap 12 feeds excess water and electrolyte from within container 10 to a return storage tank for recycling.

Central post 17 mounts the components of the electrolytic cell within housing 10 as can be seen in FIG. 2. An anode post 19 and cathode posts 20 project from lid 13.

Figure 4:
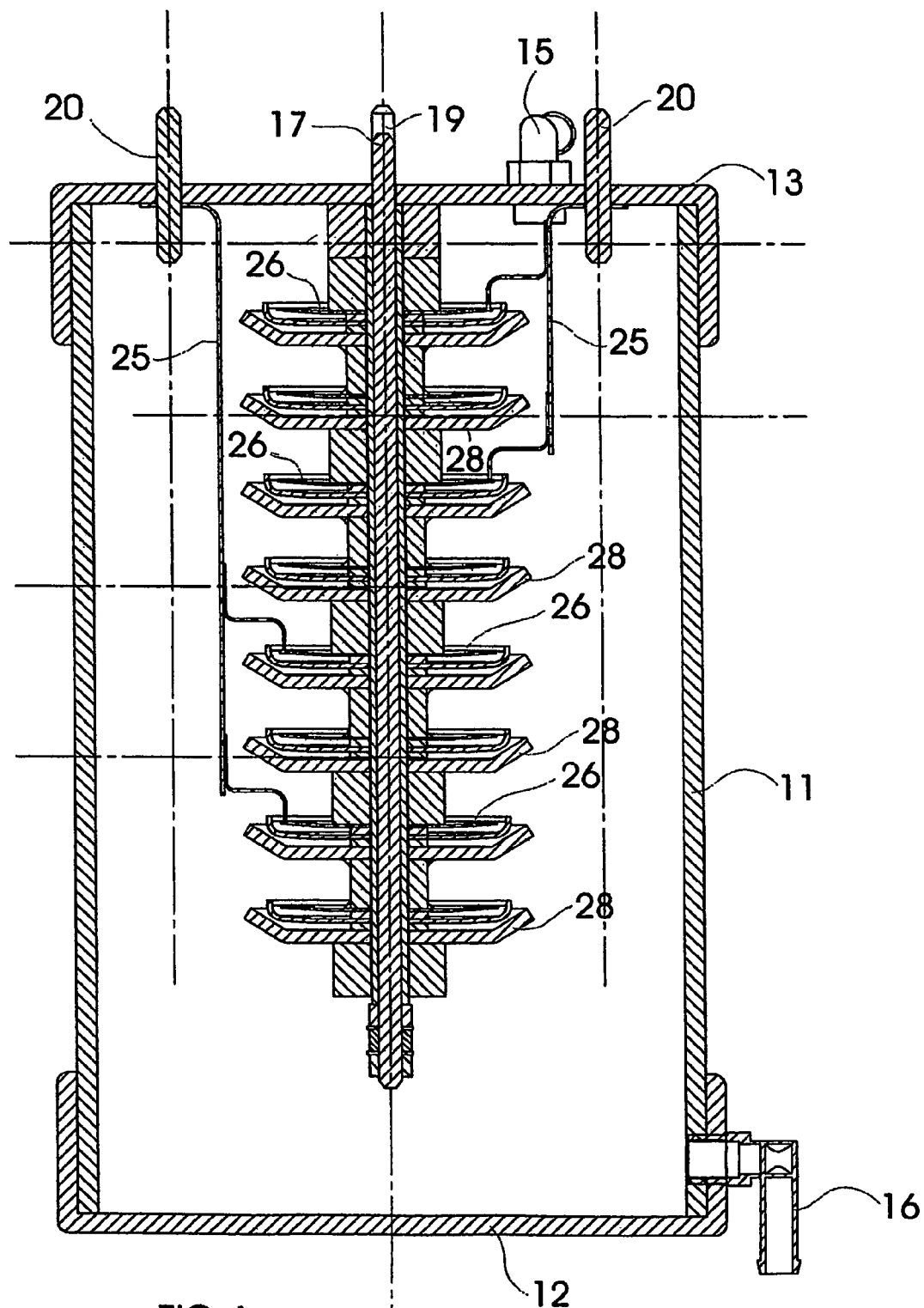
FIG. 4 is a view similar to FIG. 3 but being the section along the plane IV-IV in FIG. 1.
Figures 7, 8:
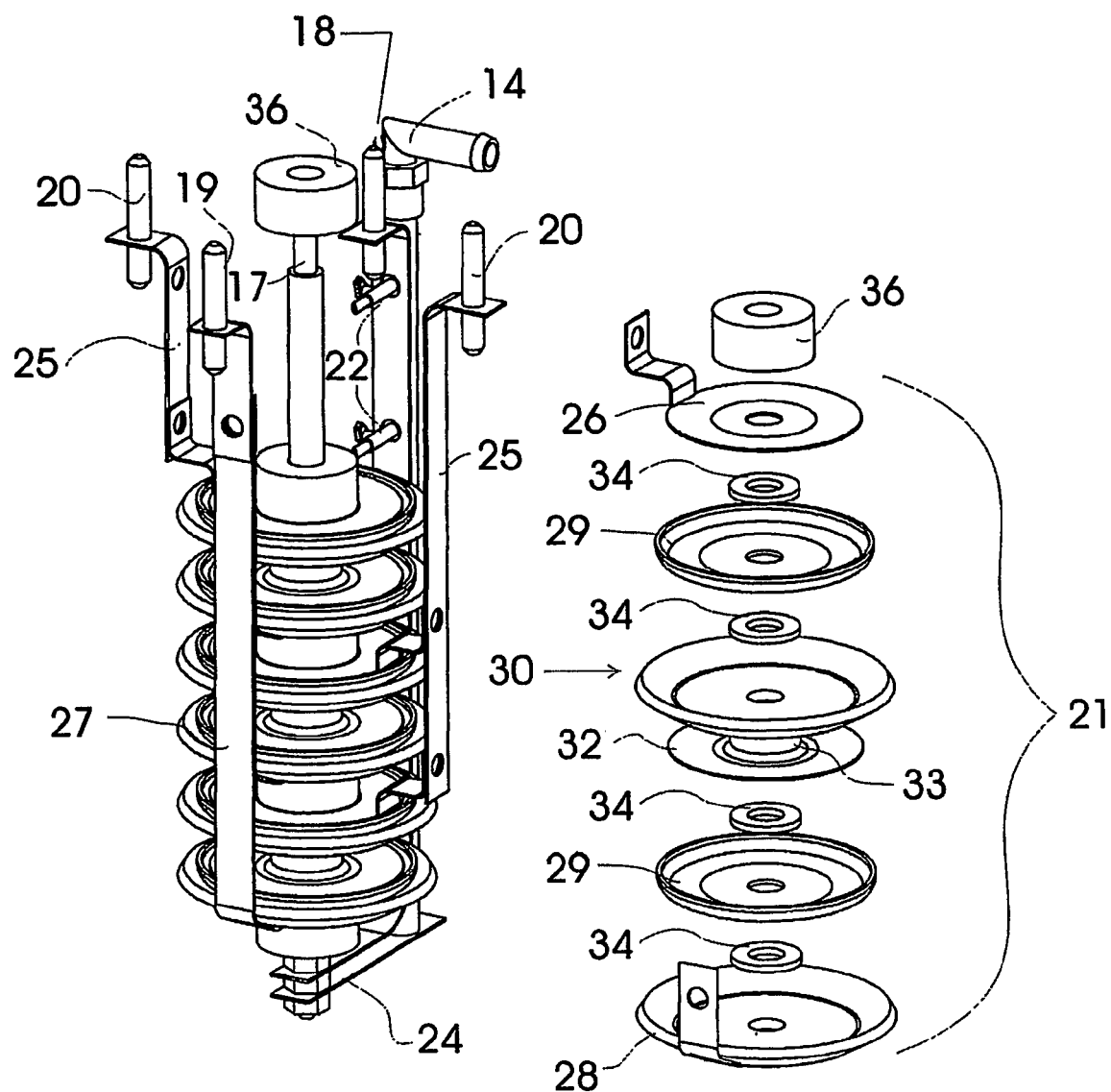
FIG. 7 is a perspective view of the electrolytic cell of FIGS. 3 and 4.
FIG. 8 is an exploded view of one anode-cathode pair assembly of the embodiment of FIG. 8.
Figure 9:
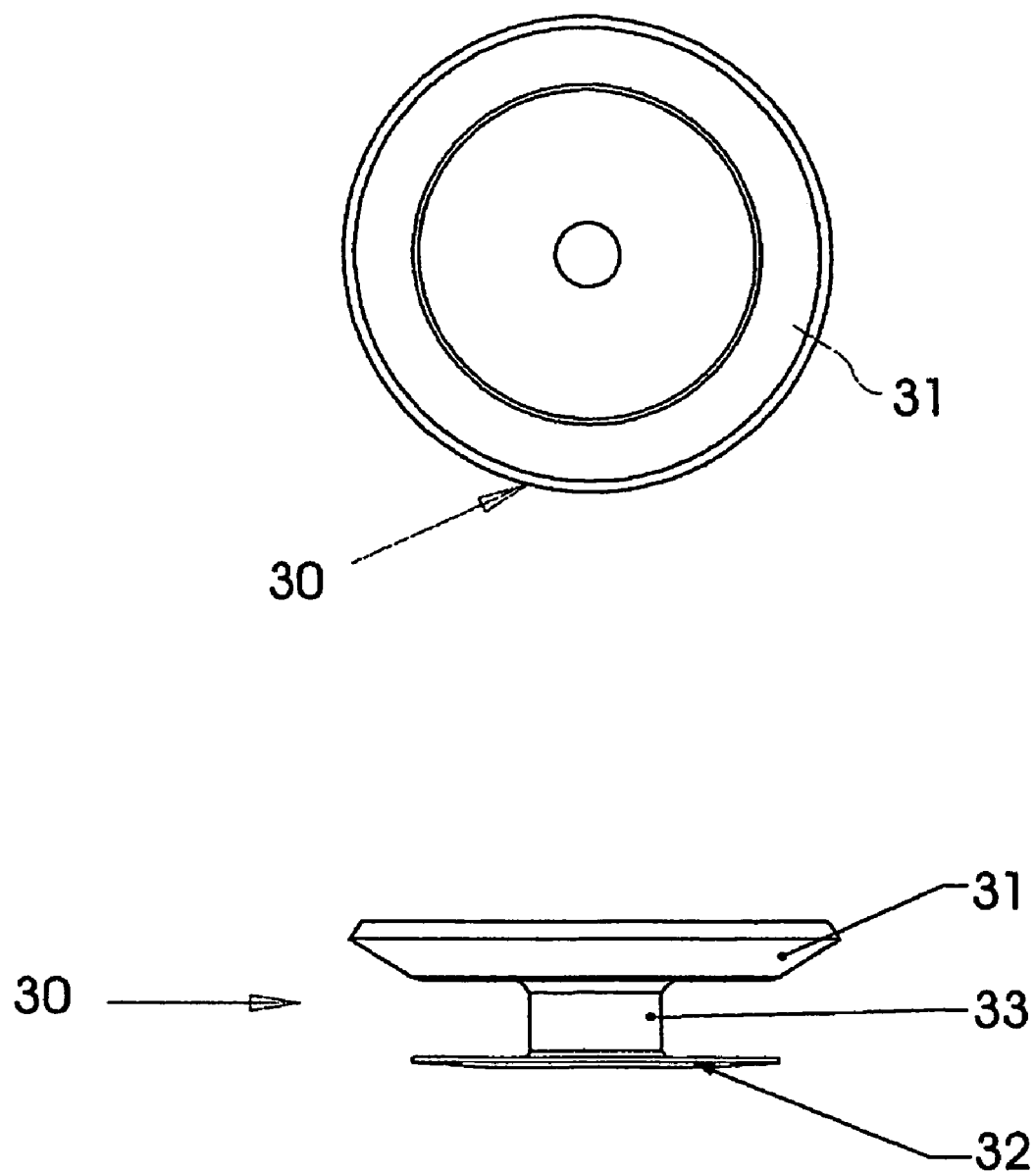
FIG. 9 shows plan and side elevation views of an intermediate component of the assembly of FIG. 8.

The internal electrolytic cell assembly as shown in FIGS. 3 and 4 comprises four cathode-anode pairs 21, as shown in FIG. 8. Electrolyte solution inlet 14 feeds to metering orifices 22 through which electrolyte solution flowing into liquid feed tube 23 is pulsed. Reed valve 24 at the base of tube 22 opens under excess pulse pressure to release into bottom cap 12 for return to a storage tank via outlet 16.

Cathodic connections 25 connect cathodes 26 to respective posts 20 and anodic connections 27 connect anodes 28 to post 19. Between each cathode-anode pair 26, 28 on, but insulated from or by, central post 17 there is located an intermediate component comprised of dish or cup-like parts 29 located beneath each cathode 26 and above each anode 28 and above and below central component 30 having the form of a single piece cup 31 and disc 32 coupled by a central joining piece 33. Electrically insulating washers 34 are fitted between the parts of cathode-anode pairs 21. In this embodiment parts 29 and 30 are formed from electrically conducting material as are cathode 26 and anode 28 and preferably that material is a stainless steel.

Each cathode 26 is formed as an inverted conical section such that the upward incline thereof not only provides some structural stiffness to the cathode but also facilitates the removal or flow of gas bubbles upward and outward when generated on the surface of each cathode during electrolysis. Each cup-shaped anode acts in a similar manner for structural stiffness and ease of gas removal during electrolysis.

As electrolyte solution is pulsed onto the top surface of each cathode 26 it fills to overflow and cascade onto cup 29 and then flows down to anode 28 via intervening central component 30 and lowermost cup 29 of each cathode-anode pair 21. The electrical circuit between the cathode 26 and the anode 28 of each cathode-anode pair 21 is completed through the cascading electrolyte solution as it flows from the cathode down via cup 29, central component 30 and cup 29 to anode 28. It appears that, once the electrolytic action commences and the electrolyte forms a froth, the electrical pathway between cathode and anode of each pair is maintained by the electrolyte solution forming the surface of each bubble which is in contact with other bubbles of the froth. The pulsing action, which introduces electrolyte solution to the top surface of each cathode 26, also facilitates a wiping action to free the bubbles of gas which adhere to the cathode. Without pulsing it has been found that overheating of the electrolyte solution within the cell can occur.

Central post 17 is either of electrically insulating material or a conductive material sheathed in electrically insulating material 35 as shown in the embodiment depicted in the drawings.

Between each cathode-anode pair assembly 21 and at the top and bottom of post 17, there is positioned an insulating block 36. Support strap 37 connects central post 17, which in this embodiment is of stainless steel, to post 18 on lid 13 via the side of feed tube 23.

Figure 5:
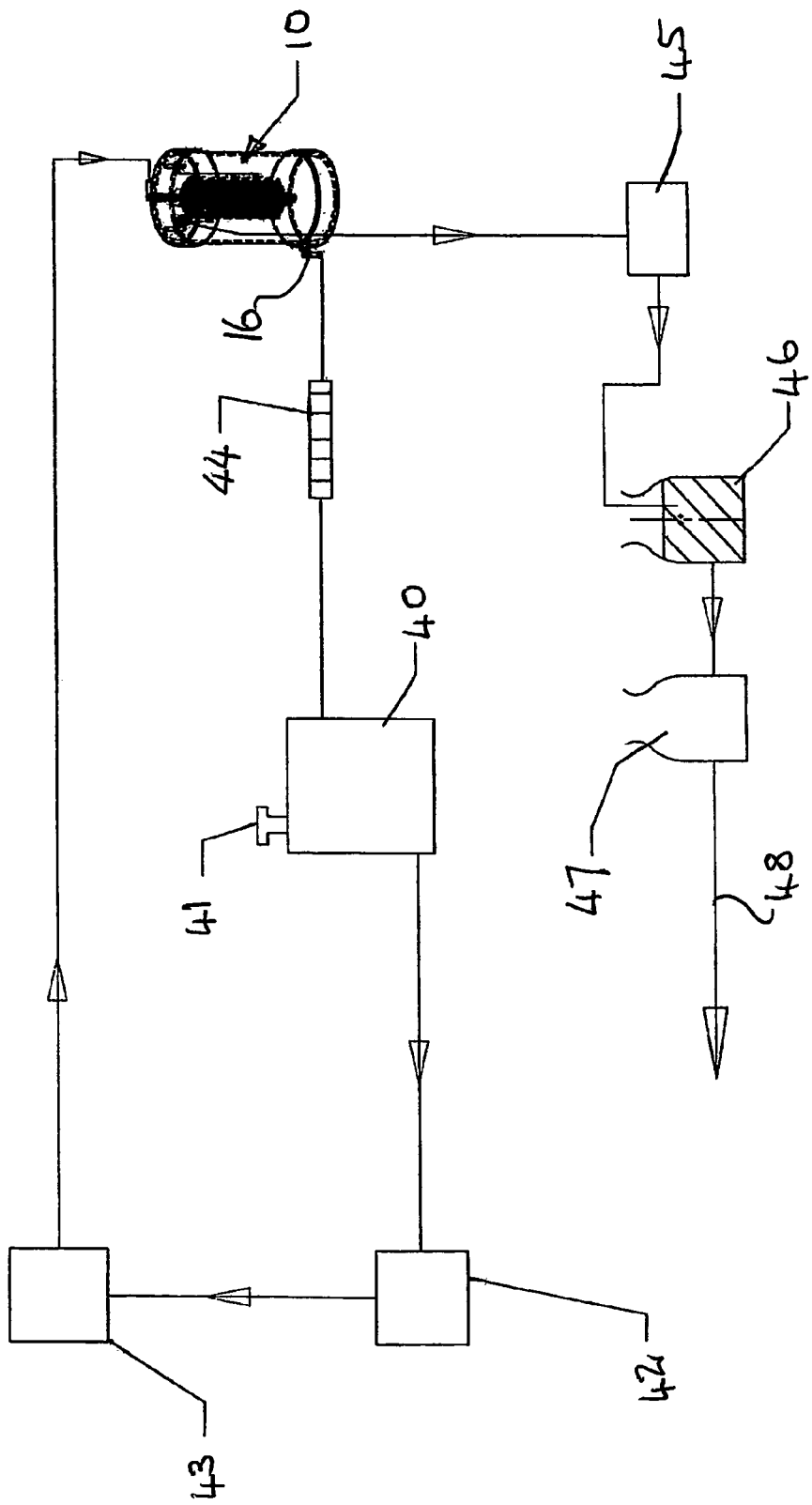
FIG. 5 is a schematic circuit diagram showing one embodiment of a circuit incorporating an electrolytic cell in accordance with the present invention for providing a clean dried mixture of hydrogen and oxygen to be fed to such as an internal combustion engine.

The schematic circuit diagram of FIG. 5 displays an embodiment showing the recirculation of electrolyte solution and the output of mixed hydrogen and oxygen for subsequent use as a fuel to be combusted in an internal combustion engine or otherwise.

In the circuit diagram of FIG. 5, aqueous electrolytic solution is stored in tank 40 having an air vent 41. Pump 42 takes solutions from tank 40 through particle filter 43 to deliver same to housing 10 containing electrodes, of the form shown by FIGS. 1 to 4 and 7 to 9, which act upon the solution to produce hydrogen and oxygen. Excess solution drains from housing 10 via outlet 16 and is returned to tank 40 after being cooled by passing through heat exchanger 44. Gaseous hydrogen and oxygen is drawn off from housing 10 via pump 45 to be passed through scrubber 46 to remove liquid and any entrained solid impurities in the gaseous mix. From scrubber 46 the gaseous mixture is passed to drying chamber 47 and then drawn off at 48 for use as required.

Figure 6:
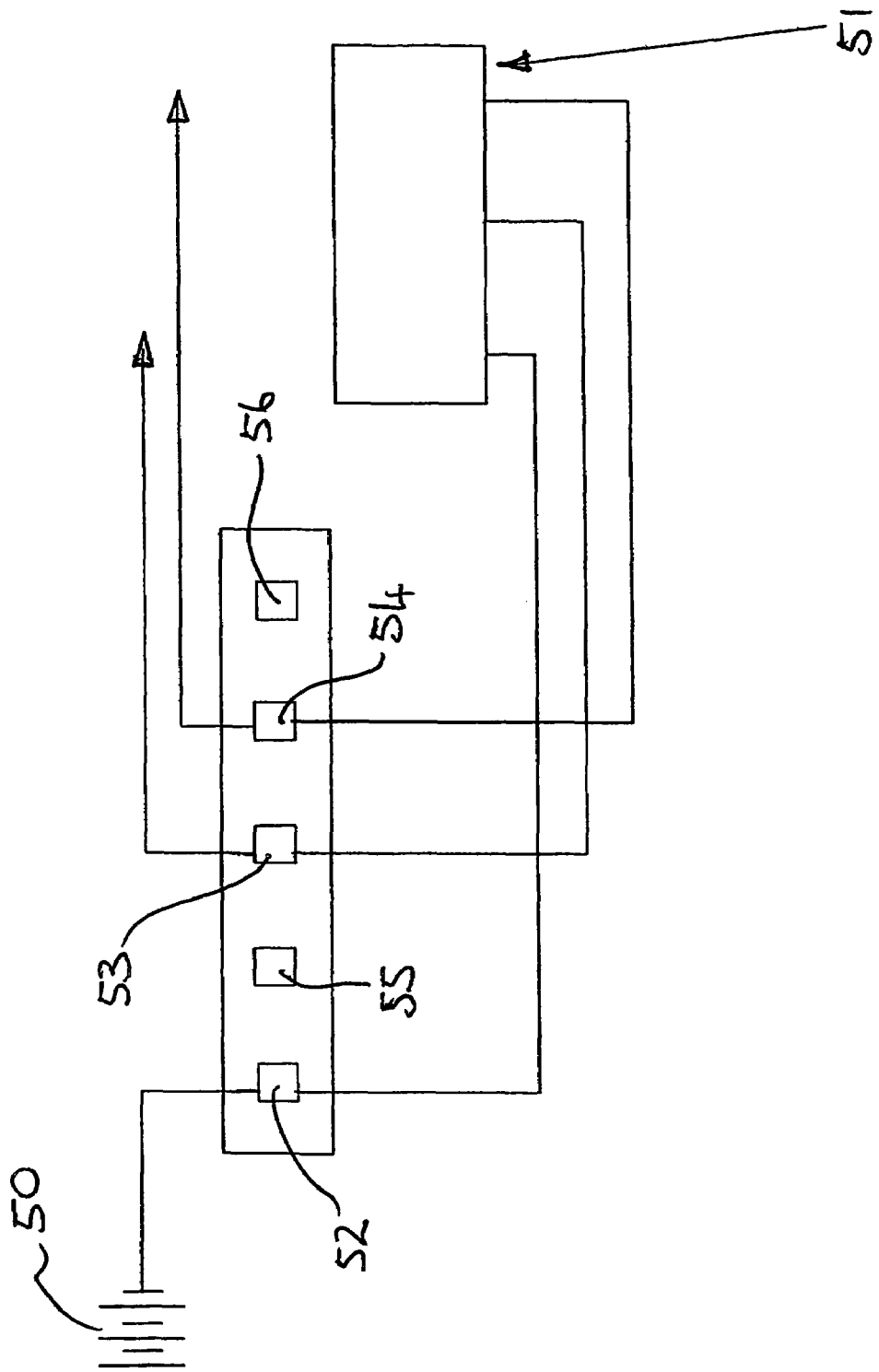
FIG. 6 is a schematic circuit diagram of an embodiment of power relays for controlling the output of an electrolytic cell circuit in accordance with the arrangement shown in FIG. 5.

The schematic circuit diagram of FIG. 6 shows a layout for power relays for controlling the operation of the arrangement of FIG. 5. The relays are set to alternately operate the cell in half or fall mode by applying voltage to one or both of posts 20, respectively.

In the circuit diagram of FIG. 6, there is shown a DC power supply 50 connected to electrical modulator unit 51 via relay 52. Output DC is applied to all cathodes of the electrolytic cell housed in container 10 via relay 53 or to a portion of those cathodes via relay 54.

Relay 55 controls operation of pump 42 while relay 56 activates pump 45. On demand operational control can be applied to relays 52-56 to ensure the generation and supply of hydrogen and oxygen as its rate of draw-off via line 48 is varied.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

The invention claimed is:

1. A method of producing a combustible mixture of hydrogen and oxygen by electrolyzing an aqueous liquid, said method including metering a pulsed flow of the aqueous liquid onto one substantially horizontal and planar electrode and retaining liquid in contact with the one electrode while facilitating an oversupply of the electrolyte to flow into contact with another substantially horizontal and planar electrode insulated from the one electrode; applying an electrical potential between said electrodes while flow of the aqueous liquid between the electrodes completes an electrical circuit between the electrodes thereby generating hydrogen and oxygen at opposite ones of said electrode pair and further wherein the electrodes are not submerged in the liquid during the electrolytic action generating hydrogen and oxygen from the liquid.

2. A method as claimed in claim 1 using a plurality of said electrode pairs sequentially arranged on a vertical column.

3. A method as claimed in claim 1 wherein the metering of the delivery of aqueous liquid to the electrodes is controlled in dependence upon the rate of generation of the combustible mixture from the electrodes.

4. A method as claimed in claim 1 wherein surplus aqueous liquid is removed from a container containing said electrodes to prevent the electrodes from being immersed in the liquid during generation of the combustible mixture.

5. A method as claimed in claim 4 wherein the removed aqueous liquid is recirculated for metering pulsed application to generate the combustible mixture.

6. A method as claimed in claim 1 wherein the delivery of aqueous solution to the electrodes is controlled for generation of hydrogen and oxygen on demand in dependence upon the rate of consumption of hydrogen and oxygen generated by electrolysis of the aqueous liquid.

7. An electrolytic cell for producing hydrogen and oxygen from an aqueous solution, said cell including a plurality of electrode pairs of opposite polarity, each electrode being substantially planar and disposed in a substantially horizontal orientation, metering means for controlling a pulsed flow of an aqueous solution onto one electrode of each pair of electrodes and wherein the solution flows from the one electrode to the other electrode of each pair and wherein, when the cell is in use, the electrodes are not immersed beneath the surface of a contained quantity of the solution.

8. An electrolytic cell as claimed in claim 7 wherein the electrodes are disposed within a container having an outlet for directing aqueous solution away from the electrodes to avoid immersion of the electrodes by a build up of the solution within the container.

9. An electrolytic cell as claimed in claim 8 wherein said container comprises a separable lid having an outlet for gases generated within the container.

10. An electrolytic cell as claimed in claim 9 wherein said lid is a gas-tight push-fit onto the container such that a build up of gases within the container is adapted to drive off the lid at a predetermined pressure.

11. An electrolytic cell as claimed in claim 7, including control means for controlling the rate of delivery of aqueous solution to the electrodes.

12. An electrolytic cell as claimed in claim 11 wherein the rate of delivery of aqueous solution is controlled in dependence upon the rate of consumption of hydrogen and oxygen output from the cell.

* * * * *